United States Patent
Haddadin (10) Patent No.: US 10,464,210 B2
(45) Date of Patent: Nov. 5, 2019

(54) METHOD AND DEVICE FOR OPEN-LOOP/CLOSED-LOOP CONTROL OF A ROBOT MANIPULATOR

(71) Applicant: Kastanienbaum GmbH, München (DE)

(72) Inventor: Sami Haddadin, Hannover (DE)

(73) Assignee: Kastanienbaum GmbH, München (DE)

( * ) Notice: Subject to any disclaimer, the term of this patent is extended or adjusted under 35 U.S.C. 154(b) by 185 days.

(21) Appl. No.: 15/515,038

(22) PCT Filed: Sep. 28, 2015

(86) PCT No.: PCT/DE2015/100404
§ 371 (c)(1),
(2) Date: Mar. 28, 2017

(87) PCT Pub. No.: WO2016/050238
PCT Pub. Date: Apr. 7, 2016

(65) Prior Publication Data
US 2017/0239815 A1    Aug. 24, 2017

(30) Foreign Application Priority Data
Sep. 30, 2014    (DE) ........................ 10 2014 114 234

(51) Int. Cl.
| | |
|---|---|
| B25J 9/16 | (2006.01) |
| B25J 13/08 | (2006.01) |
| B25J 19/06 | (2006.01) |

(52) U.S. Cl.
CPC ........... B25J 9/1676 (2013.01); B25J 13/085 (2013.01); B25J 19/063 (2013.01);
(Continued)

(58) Field of Classification Search
CPC ...... B25J 9/1676; B25J 9/1633; B25J 9/1646; B25J 9/1674; B25J 19/063; B25J 19/068;
(Continued)

(56) References Cited

U.S. PATENT DOCUMENTS

| | | | |
|---|---|---|---|
| 2010/0324733 A1 | 12/2010 | Bischoff et al. | |
| 2011/0036188 A1* | 2/2011 | Fujioka | B25J 9/102 |
| | | | 74/405 |

(Continued)

FOREIGN PATENT DOCUMENTS

| | | |
|---|---|---|
| DE | 102007063099 A1 | 7/2009 |
| DE | 102008041602 A1 | 3/2010 |

(Continued)

OTHER PUBLICATIONS

Haddadin, Sami, "Towards Safe Robots: Approaching Asimov's 1st Law", Oct. 12, 2011, pp. 42-45, XP055250770.

(Continued)

*Primary Examiner* — Spencer D Patton
(74) *Attorney, Agent, or Firm* — Hoffmann & Baron, LLP (57) ABSTRACT

The invention relates to a device and a method of controlling a robot manipulator, which includes a sensor for detecting an external force during an interaction of the robot manipulator with an environment. The proposed method is characterized in that a force-time curve is determined for the external force acting on the robot manipulator detected by the sensor, and, if the value of the detected external force is higher than a defined threshold value, a safety mode of the robot manipulator is activated, which controls a movement speed and/or a movement direction depending on the detected external force, wherein the movement speed and/or the movement direction of the robot manipulator is/are controlled depending on predetermined medical injury parameters before the safety mode is activated.

19 Claims, 3 Drawing Sheets

(52) U.S. Cl.
CPC .............. *G05B 2219/40198* (2013.01); *G05B 2219/40201* (2013.01); *G05B 2219/40202* (2013.01)

(58) Field of Classification Search
CPC ......... B25J 13/085; G05B 2219/40198; G05B 2219/40201; G05B 2219/40202; G05B 2219/40467
See application file for complete search history.

(56) References Cited

U.S. PATENT DOCUMENTS

| | | |
|---|---|---|
| 2011/0184558 A1 | 7/2011 | Jacob et al. |
| 2013/0304258 A1 | 11/2013 | Taylor et al. |
| 2014/0025197 A1 | 1/2014 | Mattern et al. |
| 2014/0052150 A1 | 2/2014 | Taylor et al. |
| 2015/0239124 A1 | 8/2015 | Haddadin et al. |
| 2016/0107315 A1 | 4/2016 | Klumpp et al. |

FOREIGN PATENT DOCUMENTS

| | | | | |
|---|---|---|---|---|
| DE | 102009058607 A1 | | 6/2011 | |
| DE | 102010048369 A1 | | 4/2012 | |
| DE | 102012015975 | * | 3/2013 | ............ B25J 13/085 |
| DE | 102012015975 A1 | | 3/2013 | |
| DE | 102012012988 A1 | | 4/2014 | |
| DE | 102013212887 A1 | | 4/2014 | |
| EP | 1046470 A2 | | 10/2000 | |
| EP | 2388111 A2 | | 11/2011 | |
| JP | 2010-052079 A | | 3/2010 | |
| WO | WO 2014/036549 A2 | | 3/2014 | |

OTHER PUBLICATIONS

English translation of the International Preliminary Report on Patentability issued in International Application No. PCT/DE2015/100404 on Apr. 4, 2017.

* cited by examiner

METHOD AND DEVICE FOR OPEN-LOOP/CLOSED-LOOP CONTROL OF A ROBOT MANIPULATOR

CROSS-REFERENCE TO RELATED APPLICATIONS

This application is the U.S. National Phase of, and Applicant claims priority from, International Application No. PCT/DE2015/100404, filed 28 Sep. 2015, and German Patent Application No. DE 10 2014 114 234.9, filed 30 Sep. 2014, both of which are incorporated herein by reference in their entirety.

BACKGROUND

The invention relates to a method and to a device for open-loop/closed-loop control of a robot manipulator, which includes a sensor for detecting a mechanical interaction with an environment. The invention further relates to a robot having such a device, as well as to a computer system, a digital storage medium, a computer program product, and a computer program.

Methods and devices for open-loop/closed-loop control of a robot manipulator are known. Thus, from DE 102010048369 A1, for example, a method and a device for safe open-loop control of at least one robot manipulator is known, wherein at least one safety functionality is monitored. A safety functionality in the sense of DE 102010048369 A1 preferably represents precisely an elementary physical variable or functionality, for example, the state or output of a switch, of a sensor, or of a computation unit. An elementary physical variable or functionality can also be multidimensional and, accordingly, it can also be formed by several switches, sensors, and/or computation units. Thus, for example, an external force acting on the manipulator, particularly at the Tool Center Point (TCP), can represent an elementary physical variable or functionality, which accordingly can be represented by a "force at the TCP" safety functionality, and which can be monitored, for example, for the presence of a threshold value or to determine whether a threshold value has been exceeded or not reached.

A safety functionality in the sense of DE 102010048369 A1 can be a contact detection, in particular by detection of a one-dimensional or multi-dimensional contact force, a collision detection, in particular by detection of forces in manipulator articulations or drives, an axial area monitoring, a path accuracy, in particular a tube around the Cartesian trajectory, a Cartesian workspace, a safety zone, a braking ramp, a braking before one or more safety zones or spatial boundaries, a manipulator configuration, a tool orientation, an axial speed, an elbow speed, a tool speed, a maximum external force or a maximum external torque, a distance with respect to the environment or a person, a retention force, or the like.

Safety functionalities are preferably monitored using a safe technology, in particular redundantly and preferably in diverse manners or with a safety protocol. For this purpose, it is preferable that one or more parameters, for example, outputs of sensors or calculation units, are detected independently of a work controller of the respective manipulator, and, in particular after further processing in a calculation unit, for example, after coordinate transformation, are monitored to determine whether threshold values have been exceeded. In a proposed embodiment, if at least one of the parameters to be detected cannot be detected reliably, for example, due to sensor failure, the corresponding safety functionality responds in a proposed embodiment.

In DE 102010048369 A1, it is then proposed to implement the safety monitoring as a state machine, which can alternate between two or more states in each of which one or more of the above-explained safety functionalities, which are predetermined for this state, are monitored. The implementation can be converted, in particular, by a corresponding programming and/or a corresponding program execution, in particular in the form of a so-called virtual state machine.

Moreover, from DE 102013212887 A1, a method for open-loop control of a robot device is known, which includes a movable robotic manipulator, in which a movement speed and/or movement direction of the manipulator is monitored and optionally adapted taking into consideration medical injury parameters and a robot dynamics. According to DE 102013212887 A1, the manipulator and/or effector can move along a predetermined path or at a predetermined movement speed. The medical injury parameters can contain information representative of an effect of a collision between the manipulator and a human body, and they can be used as input variable in the method. The effect can be an injury of a human body. A movement speed and/or movement direction of the manipulator can be adapted, for example, by reduction, in order to reduce or prevent an injury. A robot dynamics can be a physical, in particular a kinetic dynamics. A robot dynamics can be a dynamics of a rigid and resilient many-body system. For monitoring and optionally adapting the movement speed and/or movement direction of the manipulator, a collision mass, a collision speed, and/or a collision contact geometry of the manipulator can be taken into consideration. A collision mass, a collision speed, and/or a collision contact geometry of the manipulator can be used in the method as input variable. An expected collision mass, collision speed, and/or collision contact geometry of at least one predetermined relative point of the manipulator can be taken into consideration. Here, the expectation can relate to an assumed or known location of a human in the work area of the robot device, taking into consideration the predetermined movement path. In order to monitor and optionally adapt the movement speed and/or movement direction of the manipulator, characteristic values can be used, which represent, on the one hand, a relation between collision mass, collision speed, and/or collision contact geometry of the manipulator, and, on the other hand, medical injury parameters. The characteristic values can be represented in mass-speed diagrams for different contact geometries and different injury types. The contact geometries can be simple representative geometries. A contact geometry can be wedge-shaped. The contact geometry can be wedge-shaped with different angles. A contact geometry can be spherical. The contact geometries can be spherical with different diameters. An injury type can be an injury of closed skin of a body. An injury type can be an injury of muscles and tendons of a body.

SUMMARY

The aim of the invention is to indicate a method and a device for open-loop/closed-loop control of a robot manipulator, which further reduces a risk of injury or damage in the case of a collision of the robot manipulator with an object, in particular a human.

The invention results from the features of the independent claims. Advantageous developments and embodiments are the subject matter of the dependent claims. Additional features, possible applications, and advantages of the invention result from the following description as well as from the explanation of example embodiments of the invention which are represented in the figures.

The aim is achieved according to a first aspect of the invention by a method for open-loop/closed-loop control of a robot manipulator, which includes a sensor for detecting a mechanical interaction with an environment. The proposed method is characterized in that a force-time curve of an external force $\vec{F}(t)$ acting on the robot manipulator is determined based on the detection by the sensor, and, if a value $|\vec{F}(t)|$ of the detected force $\vec{F}(t)$ is greater than a defined threshold value G1: $|\vec{F}(t)|>G1$, a safety mode of the robot manipulator is activated, which open-loop/closed-loop controls a movement speed $|\vec{V}(t)|$ and/or a movement direction $\vec{V}(t)/|\vec{V}(t)|$ depending on the detected force $\vec{F}(t)$, wherein the movement speed $|\vec{V}(t)|$ and/or the movement direction $\vec{V}(t)/|\vec{V}(t)|$ of the robot manipulator is/are open-loop/closed-loop controlled depending on predetermined medical parameters before the safety control mode is activated.

In the case at hand, the term "medical parameters" is understood to mean, in particular, parameters that parametrize a degree of injury, a degree of pain sensation, a degree of damage and/or another degree of risk.

In the case at hand, the term "robot manipulator" is understood to mean a part of a mechanical robot, which enables the physical interaction of the robot with the environment, that is to say the moving part of a robot, which performs the mechanical work of the robot. The term "robot manipulator" also includes, in particular, one or more effectors of the robot manipulator that are present, as well as, if applicable, an object gripped by the robot manipulator. In the case at hand, the term "robot" is understood in the broad sense. It includes, for example, industrial robots, humanoids, robots capable of flight or capable of swimming.

In the case at hand, the term "force" or "force-time curve" is understood in the broad sense. In addition to simply directed forces, it also includes anti-parallel force pairs and forces or force actions that can be represented, i.e., in particular also torques and, moreover, variables derived from such forces or force actions, such as, for example, pressure (force/area), etc. In the case at hand, the detected force $\vec{F}(t)$ relates advantageously not to the force of gravity and not to the Coriolis force generated by the rotation of the earth.

The term "value of the force $\vec{F}(t)$" includes any metric.

The sensor is advantageously a force sensor, a moment sensor, for example, a torque sensor. Advantageously, the robot manipulator includes several such sensors, in order to detect an external force acting on the robot manipulator with sufficient resolution relative to the point of attack of the force and the value and direction thereof. In an advantageous development, the formulation "an external force $\vec{F}(t)$ acting on the robot manipulator" implies that, in addition to the direction and the value of the external force $\vec{F}(t)$, a point of attack of the force $\vec{F}(t)$ on the robot manipulator is also known or determined.

The proposed method is based on the fact that the robot manipulator is open-loop controlled in principle depending on medical parameters, as described, for example, in the cited DE 102013212887 A1. The disclosure content of DE 102013212887 A1 concerning injury parameters as well as the determination and advantageous establishment thereof is explicitly included in the present disclosure content.

According to the invention, by using the at least one sensor, an external force $\vec{F}(t)$ acting on the robot manipulator is detected, and a force-time curve is determined and stored at least temporarily. As soon as a value $|\vec{F}(t)|$ of the detected external force $\vec{F}(t)$ on the robot manipulator is greater than a defined threshold value G1: $|\vec{F}(t)|>G1$, the safety mode for open-loop/closed-loop control of the robot manipulator is activated. In an alternative, the determination or provision of the force-time curve can also occur by an estimation of the external forces based on a closed-loop control technological model of the robot manipulator or even a model-free estimation. In the case at hand, the term "sensor" should be understood in the broad sense. It also includes a closed-loop control technological model or an estimation, on the basis of which a reconstruction of the external force $\vec{F}(t)$ can occur.

In an advantageous development, the threshold value G1 is equal to zero, i.e., G1=0, so that the safety mode is activated immediately as soon as a force $\vec{F}(t)$ which, as the case may be, is above a sensor noise level or above the model inaccuracies is measured/estimated by the sensor.

The safety mode is characterized in that the movement speed $|\vec{V}(t)|$ and/or the movement direction $\vec{V}(t)/|\vec{V}(t)|$ is/are open-loop/closed-loop controlled depending on the detected external force, i.e., force vector $\vec{F}(t)$. In the case at hand, this means that the open-loop/closed-loop control of the robot manipulator is advantageously based on a speed and/or torque closed-loop control, in which the movement speed $|\vec{V}(t)|$ and/or the movement direction $\vec{V}(t)/|\vec{V}(t)|$ of the robot manipulator is/are open-loop/closed-loop controlled only depending on predetermined medical parameters. As soon as the safety mode is activated, in other words, for example, there is a switch from the previously activated speed open-loop control to a force or torque open-loop/closed-loop control of the robot manipulator, in which the movement of the robot manipulator is open-loop/closed-loop controlled depending on the external force $\vec{F}(t)$ detected by the sensor.

As a result, it is possible, in particular, to detect situations in which a squeezing of an object by the robot manipulator occurs because the object cannot get out of the way and the movement of the robot manipulator manifests itself in a continuously increasing force action, and to convert these situations into a corresponding open-loop/closed-loop control of the robot manipulator.

In a development, in the safety mode, actuators of the robot manipulator are open-looped controlled depending on the detected external force $\vec{F}(t)$. Advantageously, the torques generated by the actuators are limited depending on the detected external force $\vec{F}(t)$. Advantageously, the robot manipulator includes one or more articulations, wherein, in an advantageous development, at least one articulation angle of the articulations is limited depending on the detected external force $\vec{F}(t)$.

A development of the proposed method is characterized in that a time span $\Delta t_1$ is determined, which indicates the time span from the time when the threshold value G1 is exceeded at time $t_0$ to the time when a subsequent first maximum $\text{Max1}(|\vec{F}(t)|)$ of the force-time curve of external force $\vec{F}(t)$ at time $t_1$ is reached, further in that a time span $\Delta t_2$ is determined, which indicates the time span from $t_1$ to the time when a subsequent first minimum $Min1(|\vec{F}(t)|)$ of the force-time curve of the external force $\vec{F}(t)$ at time $t_2$ is reached, and in that the safety mode is activated only when: $\Delta t_1 + \Delta t_2 = \Delta t_G < G2$ and/or $Max1(|\vec{F}(t)|) > G3$, wherein G2 and G3 are defined threshold values.

These method steps are used for the analysis of the force-time curve of the external force acting on the robot manipulator. Typically, in the case of a collision of the robot manipulator with an object, first a force impact is generated, wherein, depending on the type of the collision and the collision speed, a first value maximum $Max1(|\vec{F}(t)|)$ of the external force $\vec{F}(t)$ can be reached within a few milliseconds ($\Delta t_1 \sim 0.1$ ms to 50 ms). Thereafter, the value $|\vec{F}(t)|$ of the external force $\vec{F}(t)$ typically decreases. Depending on whether the collision with the object represents a resilient impact, a nonresilient impact, a resilient or plastic deformation of the object or of the robot manipulator, there results a different time curve of the external force $\vec{F}(t)$ after the first force impact. In the case of a situation in which, after the occurrence of a first force impact, i.e., after the pass through a first maximum $Max1(|\vec{F}(t)|)$ and a subsequent first minimum $Min1(|\vec{F}(t)|)$, the external force $\vec{F}(t)$ detected by the sensor increases continuously, then this typically means that there is a squeezing of the object, i.e., a situation in which the (collision) object is no longer able to get out of the way of the movement of the robot manipulator, and the robot can transfer the force from the drives thereof to the clamped body. By an appropriate selection of the threshold values G2 and G3, the method can be adapted for the detection of such situations.

Advantageously, if, for a time $t > t_2$, the value $|\vec{F}(t)|$ of the external force $\vec{F}(t)$ exceeds a defined threshold value G4: $|\vec{F}(t)| > G4$, an actual movement of the robot manipulator is stopped.

Advantageously, if, for a time $t > t_2$, the value $|\vec{F}(t)|$ of the external force $\vec{F}(t)$ exceeds a defined threshold value G4: $|\vec{F}(t)| > G4$, a gravitation compensation or a compliance control is carried out, in which the robot manipulator is open-loop or closed-loop controlled in such a manner that only the force of gravity is compensated, and any additional externally applied force leads to the robot manipulator moving away in a compliant manner.

This prevents injuries and/or damage to the collision object or the robot manipulator.

Moreover, after the above-described stopping, the previous movement of the robot manipulator is advantageously carried out in a reverse direction until a value $|\vec{F}(t)|$ of the external force $\vec{F}(t)$ is less a threshold value G5: $|\vec{F}(t)| < G5$, wherein a stopping occurs again. G5 here is a defined threshold value, which, in an advantageous method variant, is selected to be equal to zero, i.e., G5=0.

Naturally, the proposed method can also be used in the context of an off-line analysis or a planning of an open-loop/closed-loop control of a robot manipulator. In this case, the detection of the external force $\vec{F}(t)$ is replaced by corresponding specifications in a force-time curve. Moreover, the robot manipulator is also replaced by a corresponding model that can be virtually open-loop/closed-loop controlled. In particular, the proposed method can advantageously be optimized and tested in a virtual application.

The invention further relates to a computer system with a data processing device, wherein the data processing device is designed so that a method, as described above, is carried out on the data processing device.

The invention further relates to a digital storage medium with electronically readable control signals, wherein the control signals can interact in such a way with a programmable computer system that a method, as described above, is carried out.

The invention further relates to a computer program product with a program code stored on a machine-readable medium for carrying out the method, as described above, when the program code is executed on a data processing device.

The invention further relates to a computer program with program codes for carrying out the method, as described above, when the program is run on a data processing device.

The invention further relates to a device for open-loop/closed-loop control of a robot manipulator, including a sensor which detects an external force $\vec{F}(t)$ acting on the robot manipulator, and a control unit which is designed and configured in such a manner that a force-time curve is determined and a movement speed $|\vec{V}(t)|$ and/or a movement direction $\vec{V}(t)/|\vec{V}(t)|$ of the robot manipulator is/are open-loop/closed-loop controlled depending on predetermined medical parameters, and which moreover is designed and configured in such a manner that, if the value $|\vec{F}(t)|$ of the detected external force $\vec{F}(t)$ is greater than a defined threshold value G1: $|\vec{F}(t)| > G1$, a safety mode of the robot manipulator is activated, which open-loop/closed-loop controls the movement speed $|\vec{V}(t)|$ and/or the movement direction $\vec{V}(t)/|\vec{V}(t)|$ depending on the detected external force $\vec{F}(t)$.

An advantageous development of the proposed device is characterized in that the control unit is moreover implemented and configured in such a manner that a time span $\Delta t_1$ is determined, which indicates the time span from the time when the threshold value G1 was exceeded at time $t_0$ to the time when a subsequent first maximum $Max1(|\vec{F}(t)|)$ of the force $\vec{F}(t)$ is reached at time $t_1$, a time $\Delta t_2$ is determined which indicates a time span from $t_1$ until the subsequent first minimum $Min1(|\vec{F}(t)|)$ of the external force $\vec{F}(t)$ is reached at time $t_2$, and the safety module is activated only when: $\Delta t_1 + \Delta t_2 = \Delta t_G < G2$ and/or $Max1(|\vec{F}(t)|) < G3$, wherein G2 and G3 are defined threshold values.

An advantageous development of the proposed device is characterized in that the control unit is moreover designed and configured so that, if, for a time $t > t_2$, the value $|\vec{F}(t)|$ of the force $\vec{F}(t)$ exceeds a defined threshold value G4: $|\vec{F}(t)| > G4$, a current movement of the robot manipulator is stopped.

An advantageous development of the proposed device is characterized in that the control unit is designed and configured in such a manner that, after the stopping, the previous movement of the robot manipulator is carried out in a reverse direction, until: $|\vec{F}(t)| < G5$, and then the movement of the robot manipulator is stopped again, wherein G5 is a defined threshold value.

Advantages and additional developments of the proposed device result from an analogous and/or appropriate transfer of the explanation provided in connection with the proposed method.

Finally, the invention relates to a robot with a device as described above.

Additional advantages, features and details result from the subsequent description, in which—if applicable in reference to the drawings—at least one embodiment example is described in detail. Identical, similar, and/or functionally equivalent parts are provided with identical reference numerals.

DETAILED DESCRIPTION

Figure 1:
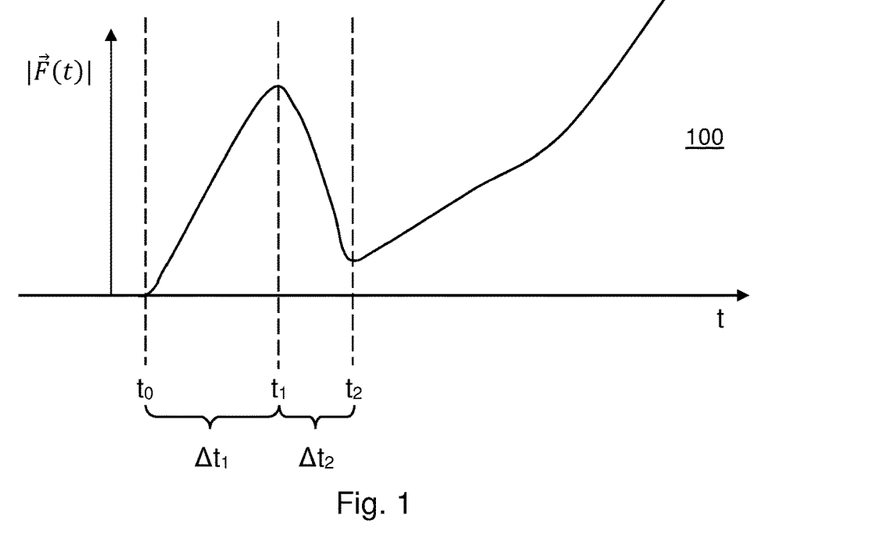
FIG. 1 shows a typical force-time curve when the robot manipulator collides with an object, in the case of a spatial blocking of the object.

FIG. 1 shows a typical force-time curve 100 in a collision of the robot manipulator with an object, in the case of a spatial blocking of the object, i.e., in the case in which the object, after the collision with the robot manipulator, cannot move away and is thus spatially immobilized and hence squeezed.

In FIG. 1, the x axis represents the time t, and the y axis represents the value $|\vec{F}(t)|$ of an external force $\vec{F}(t)$ detected by a sensor, wherein the external force $\vec{F}(t)$ acts on the robot manipulator. As can be seen from the represented force-time curve 100 determined by the control unit, starting at time $t_0$, an external force $\vec{F}(t)$ is detected by the sensor (value $|\vec{F}(t)|$ of the external force $\vec{F}(t)$ being represented in the force-time curve 100), i.e., at time $t_0$ a collision of the robot manipulator with an object occurs, for example, with an arm of a human. After a first maximum has been reached at time $t_1$ after 5 ms, for example, the value $|\vec{F}(t)|$ of the external force $\vec{F}(t)$ detected by the sensor decreases until at time $t_2$ a first minimum is reached. The represented force-time curve is not true to scale and indicates only the qualitative force over time.

Due to the spatial immobilization of the arm, for example, the arm is arranged between the robot manipulator and a wall, the arm is squeezed by the further movement of the robot manipulator, which manifests itself in the still rising force for a time greater than $t_2$.

FIGS. 2A-2E show several diagrammatic courses of action for example embodiments of the method for open-loop control of a robot manipulator 202, which, for the detection of a mechanical interaction with an environment, includes a sensor 203. The movement speed $|\vec{V}(t)|$ and/or the movement direction $\vec{V}(t)/|\vec{V}(t)|$ of the robot manipulator are open-loop controlled in this example depending on predetermined medical injury parameters. The medical injury parameters contain information representative of an effect of a collision between the robot manipulator and the human body. Further information on different injury parameters can be found in DE 102013212887 A1, to which reference is made in this regard. In the case at hand, the open-loop control of the robot manipulator occurs in principle by a speed open-loop control, which implicitly can ensure a speed, for example, by introducing a virtual (possibly variable) damping, which generates corresponding counter-torques, in order to ensure the speed in spite of the actuation in the form of a torque closed-loop control.

Figure 2A:
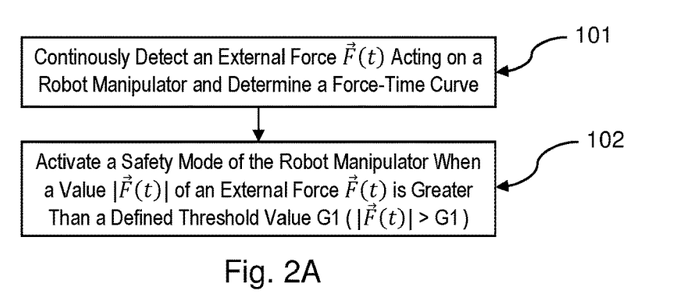
FIGS. 2A-2E show diagrammatic procedures of the proposed method for example embodiments.

In FIG. 2A, during the operation of the robot manipulator 202, a continuous detection of an external force $\vec{F}(t)$ acting on the robot manipulator is carried out by the sensor 203, and a force-time curve 100 is determined by the control unit 201, at operation 101. This force-time curve is stored at least temporarily. If, in the process, a value $|\vec{F}(t)|$ of the external force $\vec{F}(t)$ greater than a defined threshold value G1 is determined: $|\vec{F}(t)|>G1$, then a safety mode of the robot manipulator 202 is activated at operation 102. The safety mode is characterized in that the movement speed $|\vec{V}(t)|$ and/or the movement direction $\vec{V}(t)/|\vec{V}(t)|$ are open-loop controlled depending on the external force $\vec{F}(t)$. Thus, in this case of a speed open-loop control there is a switch from a speed open-loop control to a force open-loop control. However, in principle, the switch can be implemented by a torque closed-loop regulation.

Figure 2B:
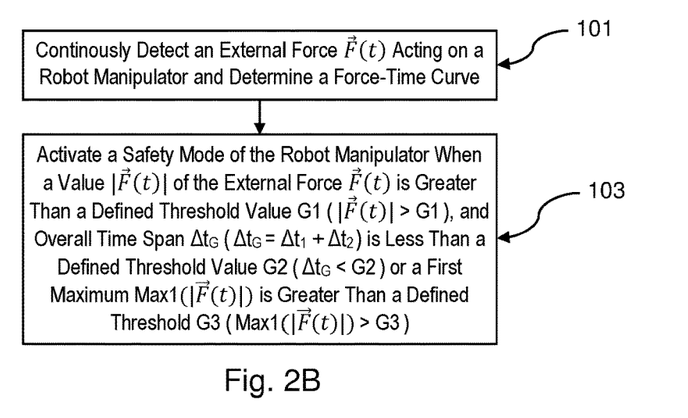

In FIG. 2B, after operation 101, a safety mode is activated at operation 103 when a value $|\vec{F}(t)|$ of the external force $\vec{F}(t)$ is greater than the defined threshold value G1: $|\vec{F}(t)|>G1$, and overall time span $\Delta t_G (\Delta t_G = \Delta t_1 + \Delta t_2) < G2$ and/or $\text{Max1}(|\vec{F}(t)|) > G3$, wherein G2 and G3 are defined threshold values.

Figure 2C:
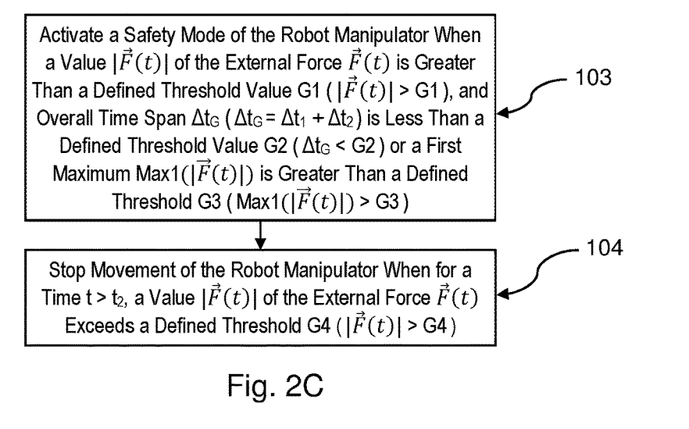

In FIG. 2C, after operation 103, when for a time $t>t_2$, the value $|\vec{F}(t)|$ of the external force $\vec{F}(t)$ exceeds a defined threshold value G4: $|\vec{F}(t)|>G4$, an actual movement of the robot manipulator 202 is stopped at operation 104.

Figure 2D:
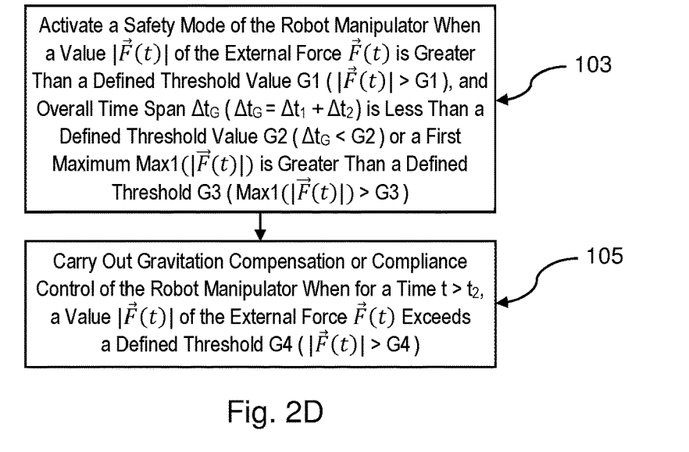

In FIG. 2D, after operation 103, when for a time $t>t_2$, the value $|\vec{F}(t)|$ of the external force $\vec{F}(t)$ exceeds a defined threshold value G4: $|\vec{F}(t)|>G4$, a gravitation compensation or a compliance control of the robot manipulator 202 is carried out at operation 105, in which the robot manipulator is open-loop or closed-loop controlled in such a manner that only the force of gravity is compensated, and any additional externally applied force leads to the robot manipulator 202 moving away in a compliant manner.

Figure 2E:
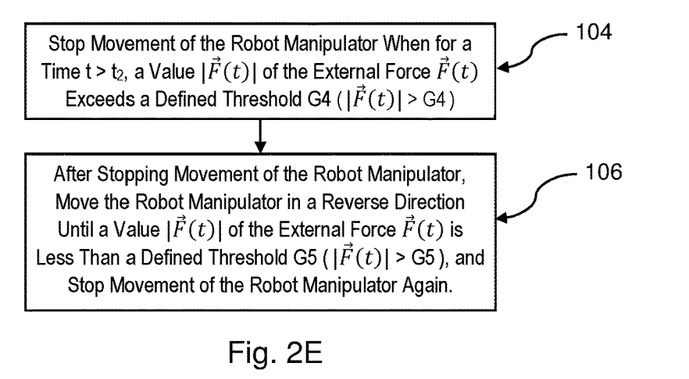

In FIG. 2E, after the above-described stopping of the actual movement of the robot manipulator 202 at operation 104 in FIG. 2C, the previous movement of the robot manipulator is advantageously carried out in a reverse direction until a value $|\vec{F}(t)|$ of the external force $\vec{F}(t)$ is less a threshold value G5: $|\vec{F}(t)|>G5$ at operation 106, wherein a stopping occurs again after carrying out the previous movement in the reverse direction. G5 here is a defined threshold value, which, in an advantageous method variant, is selected to be equal to zero, i.e., G5=0.

Figure 3:
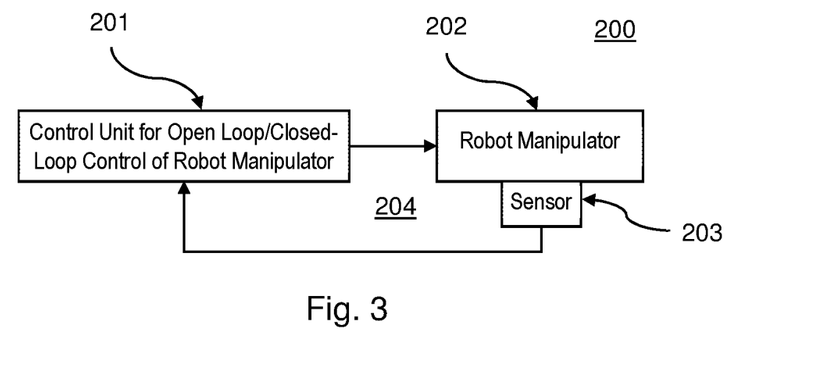
FIG. 3 shows a diagrammatic design of a robot according to the invention.

FIG. 3 shows a diagrammatic structure of a robot 200 with a device 204 for open-loop control of a robot manipulator 202 of the robot. The device 204 of the robot 200 includes a sensor 203, which detects an external force $\vec{F}(t)$ acting on the robot manipulator 202, and a control unit 201, which is designed and configured in such a manner that a force-time curve 100 is determined and movement speed $|\vec{V}(t)|$ and/or a movement direction $\vec{V}(t)/|\vec{V}(t)|$ of the robot manipulator 202 is/are controlled depending on predetermined medical injury parameters, and that, if the value $|\vec{F}(t)|$ of the detected external force $\vec{F}(t)$ is greater than a defined threshold value G1: $|\vec{F}(t)|>G1$, a safety mode of the robot manipulator 202 is activated, which open-loop controls the movement speed $|\vec{V}(t)|$ and/or the movement direction $\vec{V}(t)/|\vec{V}(t)|$ depending on the detected external force $\vec{F}(t)$. The control unit 201 is also capable, based on the value $|\vec{F}(t)|$ of the detected external force $\vec{F}(t)$ in the force-time curve 100, of performing various operations directed to the robot manipulator 202, including safety mode activation, according to the description provided hereinabove in reference to FIGS. 2B-2E.

Figure 4:
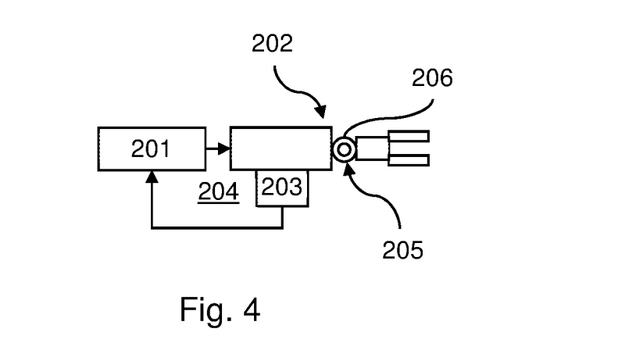
FIG. 4 shows the robot of FIG. 3 with example articulation and actuator.

FIG. 4 shows a diagrammatic design of the robot 200 shown in FIG. 3 with an example articulation 205 and actuator 206. In the safety mode, one or more actuators 206 of the robot manipulator 202 are open-looped controlled depending on the detected external force $\vec{F}(t)$. Advantageously, the torques generated by the actuators 206 are limited depending on the detected external force $\vec{F}(t)$. Advantageously, the robot manipulator 202 includes one or more articulations 205, wherein, at least one articulation angle of the articulations 205 is limited depending on the detected external force $\vec{F}(t)$.

Although the invention is illustrated and explained in greater detail by using preferred example embodiments, the invention is not limited to the disclosed examples and other variations can also be derived therefrom by the person skilled in the art, without leaving the scope of protection of the invention. Therefore, it is clear that there are numerous possible variations. It is also clear that embodiments mentioned as examples really represent only examples which in no way should be conceived of as a limitation of, for example, the scope of protection, of the possible applications, or of the configuration of the invention. Rather, the preceding description and the description of the figures enable the person skilled in the art to concretely implement the example embodiments, wherein the person skilled in the art, having learned the disclosed inventive thought, can make numerous changes, for example, with regard to the function of the arrangement, to an example embodiment of mentioned elements, without leaving the scope of protection which is defined by the claims and their legal equivalents such as, for example, a more detailed explanation in the description.

List of Reference Numerals
- 100 Force-time curve
- 101-106 Method steps
- 200 Robot
- 201 Control unit for open-loop/closed-loop control
- 202 Robot manipulator
- 203 Sensor
- 204 Device
- 205 Articulation
- 206 Actuator

The invention claimed is:

1. A method of controlling a robot manipulator, the robot manipulator comprising a sensor to detect an external force $\vec{F}(t)$ acting on the robot manipulator during mechanical interaction of the robot manipulator with an environment, wherein the method comprises:

controlling a movement speed $|\vec{V}(t)|$ or a movement direction $\vec{V}(t)/|\vec{V}(t)|$ of the robot manipulator based on speed or torque control, or speed and torque control, depending on predetermined medical parameters;

determining a force-time curve of the external force $\vec{F}(t)$ acting on the robot manipulator detected by the sensor;

determining a time span $\Delta t_1$ extending from a time $t_0$ when a value $|\vec{F}(t)|$ of the external force $\vec{F}(t)$ is greater than a defined threshold value G1 to a subsequent time $t_1$ when a first maximum $\text{Max1}(|\vec{F}(t)|)$ of the value $|\vec{F}(t)|$ of the external force $\vec{F}(t)$ is reached in the force-time curve, wherein the defined threshold value G1<the first maximum $\text{Max1}(|\vec{F}(t)|)$;

determining a time span $\Delta t_2$ extending from the time $t_1$ to a subsequent time $t_2$ when a first minimum $\text{Min1}(|\vec{F}(t)|)$ of the value $|\vec{F}(t)|$ of the external force $\vec{F}(t)$ is reached in the force-time curve, wherein an overall time span $\Delta t_G = \Delta t_1 + \Delta t_2$, and wherein the first minimum $\text{Min1}(|\vec{F}(t)|)$<the first maximum $\text{Max1}(|\vec{F}(t)|)$; and activating a safety mode of the robot manipulator when the value $|\vec{F}(t)|$ of the external force $\vec{F}(t)$ in the force-time curve is greater than the defined threshold value G1: $|\vec{F}(t)|>G1$, and the overall time span $\Delta t_G$ is less than a defined threshold value G2: $\Delta t_G < G2$ or the first maximum $\text{Max1}(|\vec{F}(t)|)$ is greater than a defined threshold G3: $\text{Max1}(|\vec{F}(t)|)>G3$, wherein in the safety mode the movement speed $|\vec{V}(t)|$ or the movement direction $\vec{V}(t)/|\vec{V}(t)|$ of the robot manipulator is controlled based on the external force $\vec{F}(t)$.

2. The method according to claim 1, wherein in the safety mode, an actuator of the robot manipulator is controlled based on the external force $\vec{F}(t)$.

3. The method according to claim 2, wherein a torque generated by the actuator, a position of the actuator, or a speed of the actuator is individually limited based on the external force $\vec{F}(t)$.

4. The method according to claim 1, wherein for G1=0.

5. The method according to claim 1, wherein the method further comprises stopping a current movement of the robot manipulator when for a time $t>t_2$, the value $|\vec{F}(t)|$ of the force $\vec{F}(t)$ exceeds a defined threshold value G4: $|\vec{F}(t)|>G4$.

6. The method according to claim 5, wherein after stopping the current movement of the robot manipulator, the method further comprises:

carrying out previous movement of the robot manipulator in a reverse direction until the value $|\vec{F}(t)|$ of the force $\vec{F}(t)$ is less than a defined threshold value G5: $|\vec{F}(t)|<G5$; and stopping the robot manipulator again after carrying out the previous movement of the robot manipulator.

7. The method according to claim 6, wherein G5=0.

8. The method according to claim 1, wherein the method further comprises:

carrying out gravitation compensation of the robot manipulator when for a time $t>t_2$, the value $|\vec{F}(t)|$ of the force $\vec{F}(t)$ exceeds a defined threshold value G4: $|\vec{F}(t)|>G4$, wherein in the gravitation compensation the robot manipulator is controlled in such a manner that only a gravitation force is compensated; and moving the robot manipulator away from at least one additional externally applied force in a compliant manner.

9. A device to control a robot manipulator, the device comprising:

a sensor to detect an external force $\vec{F}(t)$ acting on the robot manipulator during mechanical interaction of the robot manipulator with an environment; and a control unit configured to:

control a movement speed $|\vec{V}(t)|$ or a movement direction $\vec{V}(t)/|\vec{V}(t)|$ of the robot manipulator based on speed or torque control, or speed and torque control, depending on predetermined medical parameters;

determine a force-time curve of the external force $\vec{F}(t)$ acting on the robot manipulator detected by the sensor;

determine a time span $\Delta t_1$ extending from a time $t_0$ when a value $|\vec{F}(t)|$ of the external force $\vec{F}(t)$ is greater than a defined threshold value G1 to a subsequent time $t_1$ when a first maximum Max1($|\vec{F}(t)|$) of the value $|\vec{F}(t)|$ of the external force $\vec{F}(t)$ is reached in the force-time curve, wherein the defined threshold value G1<the first maximum Max1($|\vec{F}(t)|$);

determine a time span $\Delta t_2$ extending from the time $t_1$ to a subsequent time $t_2$ when a first minimum Min1($|\vec{F}(t)|$) of the value $|\vec{F}(t)|$ of the external force $\vec{F}(t)$ is reached in the force-time curve, wherein an overall time span $\Delta t_G=\Delta t_1+\Delta t_2$, and wherein the first minimum Min1($|\vec{F}(t)|$)<the first maximum Max1($|\vec{F}(t)|$); and activate a safety mode of the robot manipulator when the value $|\vec{F}(t)|$ of the external force $\vec{F}(t)$ is greater than the defined threshold value G1: $|\vec{F}(t)|$>G1, and the overall time span $\Delta t_G$ is less than a defined threshold value G2: $\Delta t_G$<G2 or the first maximum Max1($|\vec{F}(t)|$) of the value $|\vec{F}(t)|$ of the external force $\vec{F}(t)$ is greater than a defined threshold G3: Max1($|\vec{F}(t)|$)>G3, wherein in the safety mode the movement speed $|\vec{V}(t)|$ or the movement direction $\vec{V}(t)/|\vec{V}(t)|$ of the robot manipulator is controlled based on the external force $\vec{F}(t)$.

10. The device according to claim 9, wherein the robot manipulator comprises an actuator, and the control unit is configured to control the actuator based on the external force $\vec{F}(t)$.

11. The device according to claim 10, wherein the control unit is configured to individually limit a torque generated by the actuator, a position of the actuator, or a speed of the actuator based on the external force $\vec{F}(t)$.

12. The device according to claim 9, wherein G1=0.

13. The device according to claim 9, wherein the control unit is configured to stop a current movement of the robot manipulator when for a time t>$t_2$, the value $|\vec{F}(t)|$ of the force $\vec{F}(t)$ exceeds a defined threshold value G4: $|\vec{F}(t)|$>G4.

14. The device according to claim 13, wherein after stopping the current movement of the robot manipulator, the control unit is configured to:

carry out previous movement of the robot manipulator in a reverse direction until the value $|\vec{F}(t)|$ of the force $|\vec{F}(t)|$ is less than a defined threshold value G5: $|\vec{F}(t)|$<G5; and stop the robot manipulator again after carrying out the previous movement of the robot manipulator.

15. The device according to claim 14, wherein G5=0.

16. The device according to claim 9, wherein the control unit is configured to:

carry out gravitation compensation of the robot manipulator when for a time t>$t_2$, the value $|\vec{F}(t)|$ of the force $\vec{F}(t)$ exceeds a defined threshold value G4: $|\vec{F}(t)|$>G4, wherein in the gravitation compensation the robot manipulator is controlled in such a manner that only a gravitation force is compensated; and move the robot manipulator away from at least one additional externally applied force in a compliant manner.

17. A robot comprising:

a robot manipulator; and a device to control the robot manipulator, the device comprising:

a sensor to detect an external force $\vec{F}(t)$ acting on the robot manipulator during mechanical interaction of the robot manipulator with an environment; and a control unit configured to:

control a movement speed $|\vec{V}(t)|$ or a movement direction $\vec{V}(t)/|\vec{V}(t)|$ of the robot manipulator based on speed or torque control, or speed and torque control, depending on predetermined medical parameters;

determine a force-time curve of the external force $\vec{F}(t)$ acting on the robot manipulator detected by the sensor;

determine a time span $\Delta t_1$ extending from a time $t_0$ when a value $|\vec{F}(t)|$ of the external force $\vec{F}(t)$ is greater than a defined threshold value G1 to a subsequent time $t_1$ when a first maximum Max1($|\vec{F}(t)|$) of the value $|\vec{F}(t)|$ of the external force $\vec{F}(t)$ is reached in the force-time curve, wherein the defined threshold value G1<the first maximum Max1($|\vec{F}(t)|$);

determine a time span $\Delta t_2$ extending from the time $t_1$ to a subsequent time $t_2$ when a first minimum Min1($|\vec{F}(t)|$) of the value $|\vec{F}(t)|$ of the external force $\vec{F}(t)$ is reached in the force-time curve, wherein an overall time span $\Delta t_G=\Delta t_1+\Delta t_2$, and wherein the first minimum Min1($|\vec{F}(t)|$)<the first maximum Max1($|\vec{F}(t)|$); and activate a safety mode of the robot manipulator when the value $|\vec{F}(t)|$ of the external force $\vec{F}(t)$ is greater than the defined threshold value G1: $|\vec{F}(t)|$>G1, and the overall time span $\Delta t_G$ is less than a defined threshold value G2: $\Delta t_G$<G2 or the first maximum Max1($|\vec{F}(t)|$) of the value $|\vec{F}(t)|$ of the external force $\vec{F}(t)$ is greater than a defined threshold G3: $Max1(|\vec{F}(t)|) > G3$, wherein in the safety mode the movement speed $|\vec{V}(t)|$ or the movement direction $\vec{V}(t)/|\vec{V}(t)|$ of the robot manipulator is controlled based on the external force $\vec{F}(t)$.

18. A system to control a robot manipulator, wherein the system comprises:

a processing device; and a memory device to store a plurality of instructions that, when executed by the processing device, cause the processing device to perform operations comprising:

controlling a movement speed $|\vec{V}(t)|$ or a movement direction $\vec{V}(t)/|\vec{V}(t)|$ of the robot manipulator based on speed or torque control, or speed and torque control, depending on predetermined medical parameters;

determining a force-time curve of an external force $\vec{F}(t)$ acting on the robot manipulator detected by a sensor, the sensor configured to detect the external force $\vec{F}(t)$ acting on the robot manipulator during mechanical interaction of the robot manipulator with an environment; determining a time span $\Delta t_1$ extending from a time $t_0$ when a value $|\vec{F}(t)|$ of the external force $\vec{F}(t)$ is greater than a defined threshold value G1 to a subsequent time $t_1$ when a first maximum $Max1(|\vec{F}(t)|)$ of the value $|\vec{V}(t)|$ of the external force $\vec{F}(t)$ is reached in the force-time curve, wherein the defined threshold value G1 < the first maximum $Max1(|\vec{F}(t)|)$;

determining a time span $\Delta t_2$ extending from the time $t_1$ to a subsequent time $t_2$ when a first minimum $Min1(|\vec{F}(t)|)$ of the value $|\vec{F}(t)|$ of the external force $\vec{F}(t)$ is reached in the force-time curve, wherein an overall time span $\Delta t_G = \Delta t_1 + \Delta t_2$, and wherein the first minimum $Min1(|\vec{F}(t)|) <$ the first maximum $Max1(|\vec{F}(t)|)$; and activating a safety mode of the robot manipulator when the value $|\vec{F}(t)|$ of the external force $\vec{F}(t)$ is greater than the defined threshold value G1: $|\vec{F}(t)| > G1$, and the overall time span $\Delta t_G$ is less than a defined threshold value G2: $\Delta t_G < G2$ or the first maximum $Max1(|\vec{F}(t)|)$ of the value $|\vec{F}(t)|$ of the external force $\vec{F}(t)$ is greater than a defined threshold G3: $Max1(|\vec{F}(t)|) > G3$, wherein in the safety mode the movement speed $|\vec{V}(t)|$ or the movement direction $\vec{V}(t)/|\vec{V}(t)|$ of the robot manipulator is controlled based on the external force $\vec{F}(t)$.

19. A non-transitory storage medium storing instructions that, when executed by a processing device, cause the processing device to perform operations for controlling a robot manipulator, the operations comprising:

controlling a movement speed $|\vec{V}(t)|$ or a movement direction $\vec{V}(t)/|\vec{V}(t)|$ of the robot manipulator based on speed or torque control, or speed and torque control, depending on predetermined medical parameters;

determining a force-time curve of an external force $\vec{F}(t)$ acting on the robot manipulator detected by a sensor, the sensor configured to detect the external force $\vec{F}(t)$ acting on the robot manipulator during mechanical interaction of the robot manipulator with an environment;

determining a time span $\Delta t_1$ extending from a time $t_0$ when a value $|\vec{F}(t)|$ of the external force $\vec{F}(t)$ is greater than a defined threshold value G1 to a subsequent time $t_1$ when a first maximum $Max1(|\vec{F}(t)|)$ of the value $|\vec{F}(t)|$ of the external force $\vec{F}(t)$ is reached in the force-time curve, wherein the defined threshold value G1 < the first maximum $Max1(|\vec{F}(t)|)$;

determining a time span $\Delta t_2$ extending from the time $t_1$ to a subsequent time $t_2$ when a first minimum $Min1(|\vec{F}(t)|)$ of the value $|\vec{F}(t)|$ of the external force $\vec{F}(t)$ is reached in the force-time curve, wherein an overall time span $\Delta t_G = \Delta t_1 + \Delta t_2$, and wherein the first minimum $Min1(|\vec{F}(t)|) <$ the first maximum $Max1(|\vec{F}(t)|)$; and activating a safety mode of the robot manipulator when the value $|\vec{F}(t)|$ of the external force $\vec{F}(t)$ is greater than the defined threshold value G1: $|\vec{F}(t)| > G1$, and the overall time span $\Delta t_G$ is less than a defined threshold value G2: $\Delta t_G < G2$ or the first maximum $Max1(|\vec{F}(t)|)$ of the value $|\vec{F}(t)|$ of the external force $\vec{F}(t)$ is greater than a defined threshold G3: $Max1(|\vec{F}(t)|) > G3$, wherein in the safety mode the movement speed $|\vec{V}(t)|$ or the movement direction $\vec{V}(t)/|\vec{V}(t)|$ of the robot manipulator is controlled based on the external force $\vec{F}(t)$.

* * * * *